(12) United States Patent
Morishita (10) Patent No.: US 11,070,696 B2
(45) Date of Patent: Jul. 20, 2021

(54) INFORMATION PROCESSING SYSTEM (71) Applicant: KYOCERA Document Solutions Inc., Osaka (JP)

(72) Inventor: Yosuke Morishita, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/850,567

(22) Filed: Apr. 16, 2020

(65) Prior Publication Data
US 2020/0344363 A1 Oct. 29, 2020

(30) Foreign Application Priority Data

Apr. 25, 2019 (JP) .............................. JP2019-083600

(51) Int. Cl.
*H04N 1/00* (2006.01)
*H04B 5/00* (2006.01)

(52) U.S. Cl.
CPC .......... *H04N 1/0083* (2013.01); *H04B 5/0031* (2013.01); *H04N 2201/0094* (2013.01)

(58) Field of Classification Search
CPC ......... H04N 1/0083; H04N 2201/0094; H04B 5/0031
USPC ........................................................ 358/1.15
See application file for complete search history.

(56) References Cited

U.S. PATENT DOCUMENTS

| 9,588,711 B2 * | 3/2017 | Ogawa ................. H04B 5/0031 |
| 2003/0118386 A1 * | 6/2003 | Kato ..................... G06F 3/1267 400/76 |
| 2004/0100649 A1 * | 5/2004 | Johnson ................... H04L 67/16 358/1.14 |
| 2006/0164679 A1 * | 7/2006 | Kim ....................... G06F 3/1261 358/1.15 |
| 2007/0121147 A1 * | 5/2007 | Corona ................... G06F 3/126 358/1.15 |
| 2015/0277829 A1 * | 10/2015 | Morita .................. H04N 1/0022 358/1.15 |
| 2016/0044446 A1 * | 2/2016 | Futatsumori .......... G06F 3/1274 455/41.1 |
| 2017/0064756 A1 * | 3/2017 | Abe ....................... H04W 76/14 |

(Continued)

FOREIGN PATENT DOCUMENTS

JP 2013187570 A 9/2013

*Primary Examiner* — Jerome Grant, II
(74) *Attorney, Agent, or Firm* — Studebaker & Brackett PC (57) ABSTRACT

An information processing system includes a first information processing apparatus of a data migration source (first apparatus), a second information processing apparatus of a data migration destination (second apparatus), a server communicable with the first and second apparatuses via a network and a user terminal communicable with the first and second apparatuses by short range wireless communication and communicable with the server via the network. The first apparatus starts export of migrating data by communication with the user terminal and transmits the migrating data having data identification information to the server. The server stores the received migrating data. The second apparatus starts import of the migrating data by communication with the user terminal. The server reads out the migrating data on the basis of the data identification information and transmits the migrating data to the second apparatus. The second apparatus stores the received migrating data.

9 Claims, 3 Drawing Sheets (56) References Cited

U.S. PATENT DOCUMENTS

| | | | |
|---|---|---|---|
| 2019/0107977 A1* | 4/2019 | Yokoohji | G06F 3/1211 |
| 2020/0143158 A1* | 5/2020 | Tomihisa | H04N 1/00331 |
| 2020/0192618 A1* | 6/2020 | Uchida | G06F 3/1238 |
| 2020/0326893 A1* | 10/2020 | Bermundo | G06F 3/121 |
| 2020/0410124 A1* | 12/2020 | Chen | G06F 3/1288 |
| 2021/0055897 A1* | 2/2021 | Tomihisa | G06F 3/1207 |

* cited by examiner

INFORMATION PROCESSING SYSTEM

INCORPORATION BY REFERENCE

This application is based on and claims the benefit of priority from Japanese Patent application No. 2019-083600 filed on Apr. 25, 2019, the entire contents of which are incorporated herein by reference.

BACKGROUND

The present disclosure relates to an information processing system migrating data between information processing devices, such as an image forming apparatus.

In information processing devices, such as an image forming apparatus, for example, when new and old information processing devices are replaced, the old information processing device may migrate data to the new information processing device. At this time, it is necessary to temporarily store data migrated from the old information processing device into an external memory, such as a universal serial bus (USB) memory and to hold the stored data until the data is stored in the new information processing device.

For example, there is a communicating device including a proximity wireless communicating part with a built-in nonvolatile memory in which data can be written as a communicating part carrying out proximity wireless communication with an outputting device. The communicating device includes a storing means storing backup data as a backup object out of data managed by the communicating device in the nonvolatile memory, and an outputting means outputting the backup data stored in the nonvolatile memory to the outputting device via the proximity wireless communicating part in a case of a power supply stop state that electric power is not supplied to the communicating device.

However, a user of the information processing device, such as the image forming apparatus, may not allow usage of the external memory for the propose of security protection or the like. In such a case, because it is impossible to migrate data between new and old information processing devices (new and old information processing devices), a worker carrying out setup of the new information processing device needs to apply the same settings as the old device into the new device. Therefore, a burden is imposed on the worker and a lot of time is taken for the setup.

SUMMARY

An information processing system of the present disclosure includes a first information processing apparatus of a data migration source, a second information processing apparatus of a data migration destination, a server and a user terminal. The server is capable of communicating with the first information processing apparatus and the second information processing apparatus via a predetermined network. The user terminal is capable of communicating with the first information processing apparatus and the second information processing apparatus by short range wireless communication and capable of communicating with the server via the network. The first information processing apparatus starts export of predetermined migrating data in accordance with short range wireless communication with the user terminal and transmits the migrating data having predetermined added data identification information to the server. The server receives the migrating data from the first information processing apparatus and stores the migrating data. The second information processing apparatus starts import of the migrating data in accordance with short range wireless communication with the user terminal. The server reads out the migrating data on the basis of the data identification information and transmits the migrating data to the second information processing apparatus. The second information processing apparatus receives the migrating data from the server and stores the migrating data.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Figure 1:
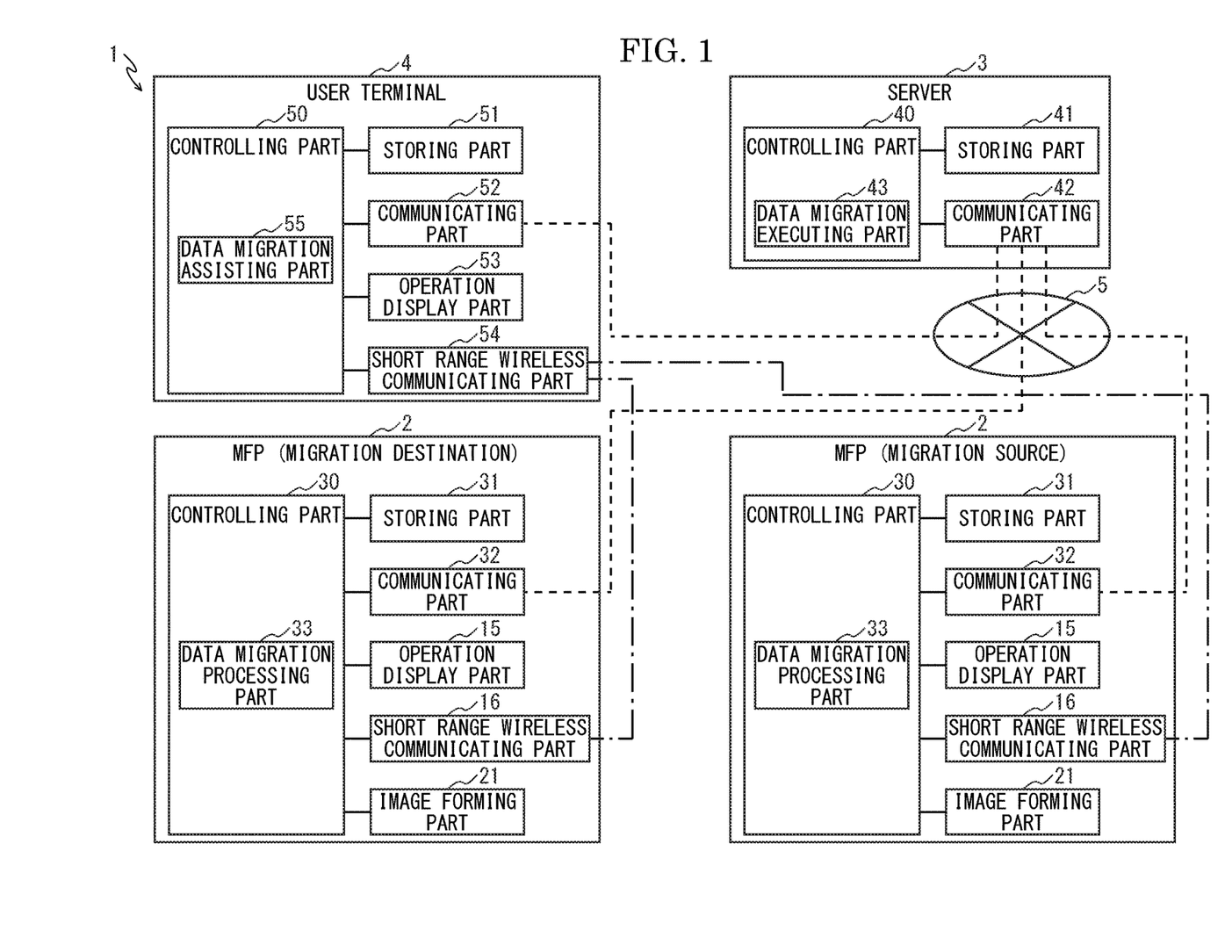
FIG. 1 is a block diagram schematically showing a configuration of an information processing system according to an embodiment of the present disclosure.

First, an information processing system 1 according to an embodiment of the present disclosure will be described with reference to FIG. 1. The information processing system 1 includes a plurality of multifunction peripherals (MFPs as an example of image forming apparatuses) 2 as information processing apparatuses, a server 3 and a user terminal 4. The plurality of multifunction peripherals 2 and the user terminal 4 are connected to the server 3 via a predetermined network 5, such as an internet. Incidentally, each multifunction peripheral 2 and the user terminal 4 can be communicated by short range wireless communication, such as near field communication (NFC).

Next, the plurality of multifunction peripherals 2 will be described. For example, as the plurality of multifunction peripherals 2, in a case of migrating data between new and old multifunction peripherals 2 in replacing of the multifunction peripherals 2 or the like, there are the multifunction peripheral 2 of a migration source (a first information processing apparatus) and the multifunction peripheral 2 of a migration destination (a second information processing apparatus). Regardless of the migration source or the migration destination, the plurality of multifunction peripherals 2 may be structured similarly, and hereinafter, one multifunction peripheral 2 will be described with reference to FIG. 2. Hereinafter, for convenience of description, it will be described so that the front side of the multifunction peripheral 2 is positioned at the near side on a paper sheet of FIG. 2. Arrows L, R, U and Lo in each FIG respectively indicate a left side, a right side, an upper side and a lower side of the multifunction peripheral 2.

Figure 2:
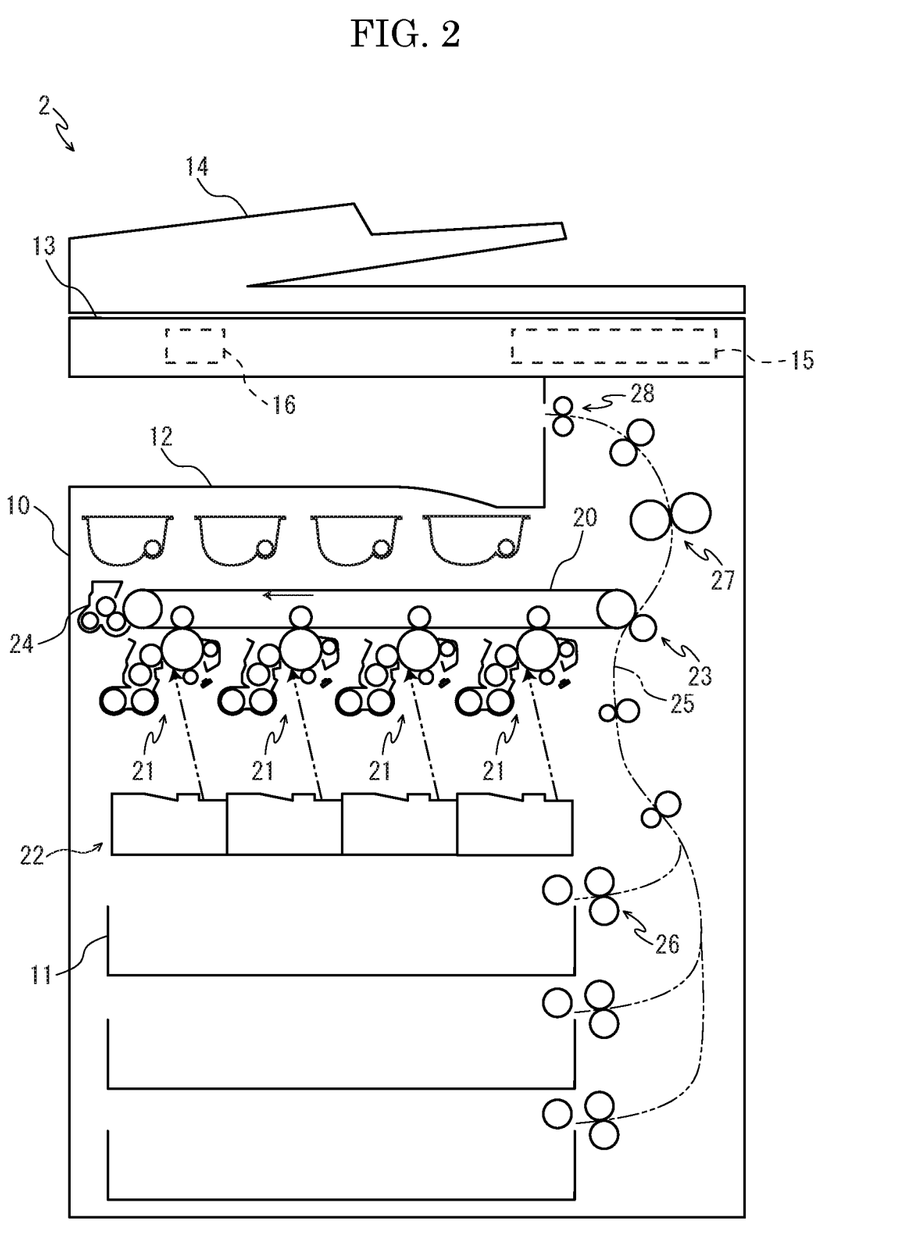
FIG. 2 is a sectional view schematically showing a multifunction peripheral according to the embodiment of the present disclosure.

The multifunction peripheral 1 includes a roughly box-formed apparatus body 10. In a lower part of the apparatus body 10, a plurality of sheet feeding cartridges 11 storing sheets are provided. In an in-body space of an upper part of the apparatus body 2, an ejected sheet tray 12 is provided.

In the upper part of the apparatus body 10, an image forming part 13 reading a document to obtain image data is provided, and the image forming part 13 includes a platen glass and a reading slit on its upper face. Above the image forming part 13, a document conveying part 14 conveying the document to make pass through pass through the reading slit is provided. The image reading part 13 carries out image reading operation reading an image from the document placed on the platen glass or the document passing through the reading slit by a scanner to create the image data.

Further, in the upper part of the apparatus body 10, an operation display part 15 and a short range wireless communicating part 16 are attached at a front side. The operation display part 15 includes, for example, operation parts of various operation keys, such as ten keys, a start key and a system menu key, a touch pad and others to receive operating of a user and a display device, such as a liquid crystal panel covering the touch pad, to display various screens. That is, the touch pad and the liquid crystal panel may compose a touch panel. The various operation keys may be provided in the touch panel.

The short range wireless communicating part 16 executes transmitting and receiving of an information signal with the user terminal 4 by short range wireless communication, such as NFC. The short range wireless communicating part 16 may utilize any function of a reader/writer function and an inter-device communication function, such as peer to peer (P2P), in order to execute transmitting and receiving of the information signal.

In a central part of the apparatus body 10, an intermediate transferring belt 20 is windingly stretched among a plurality of conveying rollers. At a lower side of the intermediate transferring belt 20, four image forming parts 21 forming the image are provided for respective toner colors (for example, four colors of yellow, magenta, cyan and black). Below the four image forming parts 21, an exposing part 22 is provided. At a right end of the intermediate transferring belt 20, a secondary transferring part 23 is provided and, at a left end of the intermediate transferring belt 20, a cleaning unit 24 cleaning the intermediate transferring belt 20 is provided. The secondary transferring part 23 is composed of a part at a right end side of the intermediate transferring belt 20 and a secondary transferring roller.

In each image forming part 21, a photosensitive drum as an image carrier is rotatably provided. At the periphery of the photosensitive drum, a charging part, a developing part, a primary transferring part, a static eliminating part and a cleaning part are arranged in a sequential order of electrophotographic process. Above respective developing parts of the image forming parts 21, toner containers respectively corresponding to the image forming parts 21 are provided for the respective toner colors (for example, four colors of yellow, magenta, cyan and black). Each toner container contains the toner of each color.

At a right part in the apparatus body 20, a conveying path 25 for the sheet is provided. At an upstream part of the conveying path 25, a plurality of sheet feeding parts 26 are provided for the respective sheet feeding cartridges 11. At a middle stream part of the conveying path 25, the above-described secondary transferring part 23 is provided. At a downstream part of the conveying path 25, a fixing device 27 is provided and, at a downstream end of the conveying path 25, a sheet ejecting part 28 is provided.

Next, image forming operation of the multifunction peripheral 2 will be described. First, in each image forming part 21, the photosensitive drum is electrically charged by the charging part, and then, exposed on the basis of the image data by the exposing part 22, and thereby, an electrostatic latent image is formed on the photosensitive drum. The electrostatic latent image on the photosensitive drum is developed for a toner image of each color by the developing part. The toner image of each color on the photosensitive drum is primarily transferred to a surface of the intermediate transferring belt 20 by the primary transferring part. The four image forming parts 21 sequentially execute the above-described operation, and thereby, a toner image of full color (a color toner image) is formed on the intermediate transferring belt 20. The color toner image is supplied to a secondary transferring part 23 at a predetermined secondary transfer timing by rotation of the intermediate transferring belt 20.

In addition, a sheet stored in the sheet feeding cartridge 11 is picked up by the sheet feeding part 26, and then, conveyed on the conveying path 25. The sheet on the conveying path 25 is conveyed to the secondary transferring part 23 at the predetermined secondary transfer timing described above. In the secondary transferring part 23, the color toner image on the intermediate transferring belt 20 is secondarily transferred to the sheet. The sheet having the secondarily transferred color toner image is conveyed to a downstream side on the conveying path 25 and, after the color toner image is fixed to the sheet by the fixing part 27, the sheet is ejected from the sheet ejecting part 28 to the ejected sheet tray 12.

Next, electric structure of the above-described multifunction peripheral 2 will be described with reference to FIG. 1. The multifunction peripheral 2 includes a controlling part 30 composed of a central processing unit (CPU) or the like, and a storing part 31 composed of a ROM, a RAM, an HDD and others inside the apparatus body 10. The controlling part 30 is connected to the storing part 31 and executes arithmetic process on the basis of control programs and control data stored in the storing part 31 to control each component of the multifunction peripheral 2 connected to the controlling part 30.

For example, the controlling part 30 is connected to each component, such as the operation display part 15, the short range wireless communicating part 16 and the image forming parts 21, and controls these components. The controlling part 30 is connected to a communicating part 32, and the communicating part 32 is communicably connected to the server 3 via the network 5. The communicating part 32 may establish pairing with the server in accordance with activation of the multifunction peripheral 2 or pairing execution by operating of the operation display part 15 to be always connected with the server 3. Moreover, the controlling part 30 works as a data migration processing part 33 by executing a data migration processing program stored in the storing part 31.

The storing part 31 stores, for example, as data set by the user via operating of the operation display part 15, print settings, such as color density, an address book used for a transmitting function, a facsimile function and others, system setting peculiar to the user. Incidentally, these data are stored in specific storing areas (paths of holders or the like) in the storing part 31, and then, read out and used by each operation of the multifunction peripheral 2, such as the image forming operation, the transmitting function, the facsimile function and a displaying function of the operation display part 15, accordingly. Therefore, these data are also stored in storing areas corresponding to the respective operation in the other multifunction peripheral 2, and become migrating data migrated between new and old multifunction peripherals 2 in replacing of the multifunction peripherals 2.

The data migration processing part 33 is executed in accordance with execution of data migration assisting application by the user terminal 4 when the migrating data is migrated between the multifunction peripherals 2. The data migration processing part 33 of the multifunction peripheral 2 of the migration source (the old multifunction peripheral 2 or the like) executes an export function making the migrating data temporarily store in the server 3. The data migration processing part 33 of the multifunction peripheral 2 of the migration destination (the new multifunction peripheral 2 or the like) executes an import function obtaining the migrating data from the server 3.

First, the export function of the data migration processing part 33 will be described. When the data migration processing part 33 receives an export preparation request from the user terminal 4 via the short range wireless communicating part 16, the data migration processing part 33 issues migration source information, such as an IP address, of its own multifunction peripheral (of the migration source). At this time, the data migration processing part 33 also issues data identification information, such as a serial number, added to the migrating data. The data identification information may be determined so as to avoid overlap with the other data identification information, for example, may contain information peculiar to each multifunction peripheral 2. The data migration processing part 33 responds to the export preparation request to transmit the migration source information and the data identification information to the user terminal 4 via the short range wireless communicating part 16.

Moreover, when the data migration processing part 33 receives a data transmission request from the server 3 via the communicating part 32, the data migration processing part 33 reads out the migrating data from the storing part 31 and transmits the read-out migrating data to the server 3. At this time, the data migration processing part 33 creates, for example, the migrating data of a text file format. In addition, the data migration processing part 33 adds the data identification information to the migrating data, for example, inserts the data identification information into leading several bits of the migrating data.

Next, the import function of the data migration processing part 33 will be described. When the data migration processing part 33 receives an import preparation request from the user terminal 4 via the short range wireless communicating part 16, the data migration processing part 33 issues migration destination information, such as the IP address, of its own multifunction peripheral (of the migration destination). Incidentally, the migration destination information contains the data identification information. The data migration processing part 33 responds to the import preparation request to transmit an import start request containing the migration destination information and the data identification information to the server 3 via the communicating part 32.

Moreover, the data migration processing part 33 receives the migrating data as a response to the import start request from the server 3 via the communicating part 32. The data migration processing part 33 executes import by storing the received migrating data in the storing area corresponding to each operation in the storing part 31 so that the migrating data can be used for each operation of the multifunction peripheral 2 of the migration destination. When the data migration processing part 33 completes the import of the migrating data, the data migration processing part 33 transmits an import completion notification to the user terminal 4 via the short range wireless communicating part 16 or the server 3

Next, the server 3 will be described. The server 3 is a server running a service of the data migration assisting application executed by the user terminal 4.

Electric structure of the server 3 will be described with reference to FIG. 1. The server 3 includes a controlling part 40 composed of a central processing unit (CPU) or the like, and a storing part 41 composed of a ROM, a RAM, an HDD and others. The controlling part 40 is connected to the storing part 41 and executes arithmetic process on the basis of control programs and control data stored in the storing part 41 to control each component of the server 3 connected to the controlling part 40.

For example, the controlling part 40 is connected to a communicating part 42, and the communicating part 42 is communicably connected to the plurality of multifunction peripherals 2 and the user terminal 4 via the network 5. For example, the communicating part 42 is connected to the multifunction peripheral 2 by pairing with the multifunction peripheral 2 and connected to the user terminal 4 in accordance with execution of the data migration assisting application by the user terminal 4. Moreover, the controlling part 40 works as a data migration executing part 43 by executing a data migration executing program stored in the storing part 41. The storing part 41 stores the migrating data received from the multifunction peripheral 2 of the migration source by the data migration executing part 43.

The data migration executing part 43 is executed, similar to the data migration processing part 33 of the multifunction peripheral 2, in accordance with execution of the data migration assisting application by the user terminal 4 when the migrating data is migrated between the multifunction peripherals 2. The data migration executing part 43 executes an export function receiving the migrating data from the multifunction peripheral 2 of the migration source (the old multifunction peripheral 2) and temporarily storing the migrating data, and an import function transmitting the temporarily stored migrating data to the multifunction peripheral 2 of the migration destination (the new multifunction peripheral 2).

First, the export function of the data migration executing part 43 will be described. When the data migration executing part 43 receives the export start request from the user terminal 4 via the communicating part 42, the data migration executing part 43 transmits the data transmission request as a response to the export start request to the multifunction peripheral 2 of the migration source. Incidentally, the export start request contains the migration source information. The data migration executing part 43 identifies the multifunction peripheral 2 of the migration source as a communication destination on the basis of the migration source information contained in the export start request and transmits the data transmission request to the multifunction peripheral 2 of the migration source.

Moreover, the data migration executing part 43 receives the migrating data as a response to the data transmission request from the multifunction peripheral 2 of the migration source. The data migration executing part 43 executes export by making the received migrating data in a state identified by the data identification information or the migration source information and storing the migrating data in the storing part 41. When the data migration executing part 43 completes the export of the migrating data, the data migration executing part 43 transmits an export completion notification to the user terminal 4 via the communicating part 42.

Next, the import function of the data migration executing part 43 will be described. When the data migration executing part 43 receives the import start request containing the data identification information and the migration destination information from the multifunction peripheral 2 of the migration destination via the communicating part 42, the data migration executing part 43 transmits the migrating data stored in the storing part 41 as a response to the import start request to the multifunction peripheral 2 of the migration destination via the communicating part 42. At this time, the data migration executing part 43 reads out the migrating data from the storing part 41 on the basis of the data identification information, identifies the multifunction peripheral 2 of the migration destination as a communication destination on the basis of the migration destination information, and transmits the read-out migrating data to the multifunction peripheral 2 of the migration destination.

Next, the user terminal 4 will be described. The user terminal 4 is a computer, such as a smart phone or a tablet terminal, capable of communicating with the server and capable of communicating with the multifunction peripheral 2 by short range wireless.

Electric structure of the user terminal 4 will be described with reference to FIG. 1. The user terminal 4 includes a controlling part 50 composed of a central processing unit (CPU) or the like, and a storing part 51 composed of a ROM, a RAM, an HDD and others. The controlling part 50 is connected to the storing part 51 and executes arithmetic process on the basis of control programs and control data stored in the storing part 51 to control each component of the user terminal 4 connected to the controlling part 50.

For example, the controlling part 50 is connected to a communicating part 52, and the communicating part 52 is communicably connected to the server 3 via the network 5. For example, when the communicating part 52 executes the data migration assisting application, the communicating part 52 is connected to the server 3. When the communicating part 52 completes execution of the data migration assisting application, the communicating part 52 interrupts connection to the server 3.

The user terminal 4 includes an operation display part 53 and a short range wireless communicating part 54, and the controlling part 50 is connected to components, such as the operation display part 53 and the short range wireless communicating part 54, to control these components. The operation display part 53 includes, for example, operation parts, such as a pointing device, a key board and a touch pad, to receive operating of the user and a display device, such as a liquid crystal panel covering the touch pad, to display various screens. That is, the touch pad and the liquid crystal panel may compose a touch panel. The pointing device and the key board may be provided in the touch panel.

The short range wireless communicating part 54 executes transmitting and receiving of an information signal with the multifunction peripheral 2 by short range wireless communication, such as NFC. The short range wireless communicating part 54 may utilize any function of a reader/writer function and an inter-device communication function, such as P2P, in order to execute transmitting and receiving of the information signal. Thereby, when the user carries out tap operating of holding the user terminal 4 (the short range wireless communicating part 54) over the multifunction peripheral 2 (short range wireless communicating part 16) or bringing the user terminal 4 into contact with the multifunction peripheral 2, the short range wireless communication between the user terminal 4 and the multifunction peripheral 2 can be actualized.

The controlling part 50 works as a data migration assisting part 55 by executing the data migration assisting application stored in the storing part 51. In the user terminal 4, the controlling part 50 downloads the data migration assisting application from the server 3 or the other application server via the communicating part 52 and stores the data migration assisting application in the storing part 51.

The data migration assisting part 55 is executed when the migrating data is migrated between the multifunction peripherals 2. The data migration assisting part 55 executes an export assisting function assisting the export function of the multifunction peripheral 2 of the migration source (the old multifunction peripheral 2) and the server 3 and an import assisting function assisting the import function of the multifunction peripheral 2 of the migration destination (the new multifunction peripheral 2) and the server 3.

When the data migration assisting application is activated in accordance with operating of the operation display part 53, the data migration assisting part 55 makes, for example, the display device of the operation display part 53 display a data migration assisting screen. On the data migration assisting screen, an export start key and an import start key is operably displayed. The data migration assisting part 55 executes the export assisting function in accordance with operating of the export start key and executes the import assisting function in accordance with operating of the import start key. Incidentally, on the data migration assisting screen, after the export start key is operated, an instruction screen instructing tap operating of the user terminal 4 to the multifunction peripheral 2 of the migration source may be displayed, and after the import start key is operated, an instruction screen instructing tap operating of the user terminal 4 to the multifunction peripheral 2 of the migration destination may be displayed.

First, the export assisting function of the data migration assisting part 55 will be described. The export assisting function is executed by tap operating of the user terminal 4 to the multifunction peripheral 2 of the migration source after the export start key is operated. The data migration assisting part 55 transmits the export preparation request to the multifunction peripheral 2 of the migration source via the short range wireless communicating part 54 in accordance with this tap operating.

Moreover, the data migration assisting part 55 receives the migration source information and the data identification information as a response to the export preparation request from the multifunction peripheral 2 of the migration source via the short range wireless communicating part 54. Incidentally, the data migration assisting part 55 stores the data identification information in the storing part 51. The data migration assisting part 55 transmits the export start request containing the migration source information to the server 3 via the communicating part 52.

Further, the data migration assisting part 55 receives the export completion notification from the server 3 when the server 3 completes receiving (export) of the migrating data from the multifunction peripheral 2 of the migration source. The data migration assisting part 55 makes the display device of the operation display part 53 display the export completion notification.

Next, the import assisting function of the data migration assisting part 55 will be described. The import assisting function is executed by tap operating of the user terminal 4 to the multifunction peripheral 2 of the migration destination after the import start key is operated. The data migration assisting part 55 transmits the import preparation request containing the data identification information stored in the storing part 51 at the export to the multifunction peripheral 2 of the migration destination via the short range wireless communicating part 54 in accordance with this tap operating.

Moreover, the data migration assisting part 55 receives the import completion notification from the server (or the multifunction peripheral 2 of the migration destination)

when the multifunction peripheral 2 of the migration destination completes receiving (import) of the migrating data from the server 3. The data migration assisting part 55 makes the display device of the operation display part 53 display the import completion notification.

Figure 3:
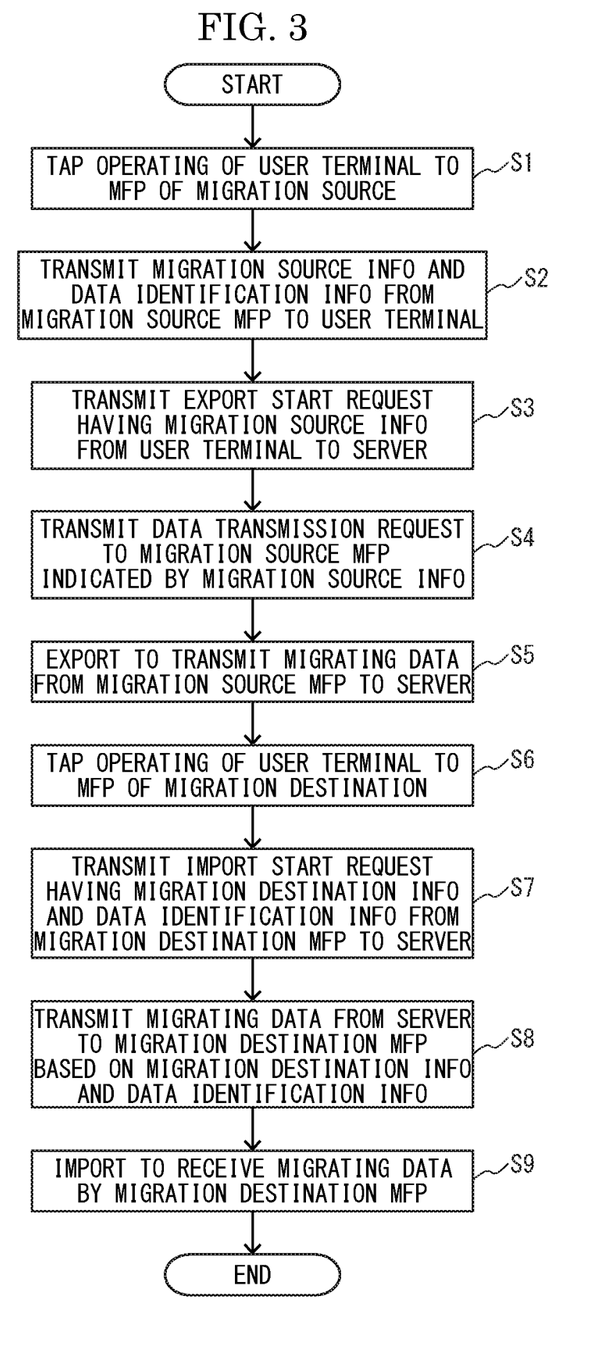
FIG. 3 is a flow chart showing data migrating operation in the information processing system according the embodiment of the present disclosure.

Next, an example of migrating operation of the migrating data between the multifunction peripherals 2 in the information processing system 1 will be described with reference to a flow chart in FIG. 3.

First, in order to carry out the export of the migrating data, the user operates the export start key of the user terminal 4 in a state that the data migration assisting application of the user terminal 4 is activated, and then, carries out tap operating of the user terminal 4 to the multifunction peripheral 2 of the migration source (step S1). In accordance with this tap operating, the user terminal 4 transmits the export preparation request to the multifunction peripheral 2 of the migration source by short range wireless communication.

In response to this export preparation request, the multifunction peripheral 2 of the migration source transmits the migration source information and the data identification information to the user terminal 4 by short range wireless communication (step S2).

In response to this migration source information, the user terminal 4 transmits the export start request containing the migration source information to the server 3 via the network 5 (step S3).

In response to this export start request, the server 3 transmits the data transmission request to the multifunction peripheral 2 of the migration source indicated by the migration source information contained in the export start request via the network 5 (step S4).

In response to this data transmission request, the multifunction peripheral 2 of the migration source transmits the migrating data to the server 3 via the network 5 (step S5). The server 3 stores the migrating data, and thereby, the export is completed.

Next, in order to carry out the import of the migrating data, the user operates the import start key of the user terminal 4 in a state that the data migration assisting application of the user terminal 4 is activated, and then, carries out tap operating of the user terminal 4 to the multifunction peripheral 2 of the migration destination (step S6). In accordance with this tap operating, the user terminal 4 transmits the import preparation request containing the data identification information stored in the storing part 51 at the export to the multifunction peripheral 2 of the migration destination by short range wireless communication.

In response to this import preparation request, the multifunction peripheral 2 of the migration destination transmits the import start request containing the migration destination information and the data identification information to the server 3 via the network 5 (step S7).

In response to this import start request, the server 3 reads out the exported migrating data on the basis of the data identification information and transmits the read-out migrating data to the multifunction peripheral 2 of the migration destination indicated by the migration destination information via the network 5 (step S8).

The multifunction peripheral 2 of the migration destination receives and stores the migrating data, and thereby, the import is completed.

Incidentally, in the above-described embodiment, although an example in which, when executing the export, the multifunction peripheral 2 of the migration source transmits the migration source information and the data identification information to the user terminal 4 in accordance with the export preparation request from the user terminal 4 and the user terminal 4 transmits the export start request containing the migration source information to the server 3 was described, the present disclosure is not limited by this example.

For example, as the other example, the multifunction peripheral 2 of the migration source may transmit only the data identification information to the user terminal 4 in accordance with the export preparation request from the user terminal 4 and the multifunction peripheral 2 of the migration source may further transmit the export start request containing the migration source information to the server 3. In such a case, the server 3 receives the export start request from the multifunction peripheral 2 of the migration source and transmits the data transmission request to the multifunction peripheral 2 of the migration source in accordance with this export start request.

Moreover, in the above-described embodiment, although an example in which, when executing the import, the user terminal 4 transmits the import preparation request containing the data identification information to the multifunction peripheral 2 of the migration destination and the multifunction peripheral 2 of the migration destination transmits the import start request containing the migration destination information and the data identification information to the server 3 in accordance with the import preparation request was described, the present disclosure is not limited by this example.

For example, as the other example, the user terminal 4 may transmit the import preparation request not containing the data identification information to the multifunction peripheral 2 of the migration destination and the multifunction peripheral 2 of the migration destination may transmit the migration destination information to the user terminal 4 in accordance with the import preparation request. In such a case, the user terminal 4 transmits the import start request containing the migration source information received from the multifunction peripheral 2 of the migration destination and the data identification information to the server 3. The server 3 receives the import start request from the user terminal 4 and transmits the migrating data to the multifunction peripheral 2 of the migration destination in accordance with this import start request.

In accordance with the embodiment, as described above, the information processing system 1 includes the multifunction peripheral 2 of a data migration source (the first information processing apparatus), the multifunction peripheral 2 of a data migration destination (the second information processing apparatus), the server 3 capable of communicating with the multifunction peripherals 2 of the migration source and the migration destination via the predetermined network 5, and the user terminal 4 capable of communicating with the multifunction peripherals 2 of the migration source and the migration destination by short range wireless communication and capable of communicating with the server 3 via the network 5. The multifunction peripheral 2 of the migration source starts the export of the predetermined migrating data in accordance with short range wireless communication with the user terminal 4 and transmits the migrating data having the predetermined added data identification information to the server 3, and the server 3 receives the migrating data from the multifunction peripheral 2 of the migration source and stores the migrating data. The multifunction peripheral 2 of the migration destination starts the import of the migrating data in accordance with short range wireless communication with the user terminal 4, the server 3 reads out the migrating data on the basis of the data identification information and transmits the migrating data to the multifunction peripheral 2 of the migration destination, and the multifunction peripheral 2 of the migration destination receives the migrating data from the server 3 and stores the migrating data.

Thereby, the user can migrate data between the multifunction peripherals 2 by simple operating with utilizing the user terminal 4 capable of short range wireless communication. Moreover, since it is unnecessary to use any external memory, such as the USB memory, it is possible to protect security. Incidentally, since the migrating data is automatically backed up to the server 3, even if the multifunction peripheral 2 has broken down, it is possible to restore the migrating data.

For example, in the information processing system 1 of the embodiment, when starting the export, the multifunction peripheral 2 of the migration source transmits the migration source information of the multifunction peripheral 2 of the migration source and the data identification information to the user terminal 4 by short range wireless communication. The user terminal 4 transmits the migration source information received from the multifunction peripheral 2 of the migration source to the server 3. The server 3 transmits the data transmission request to the multifunction peripheral 2 of the migration source on the basis of the migration source information received from the user terminal 4. The multifunction peripheral 2 of the migration source transmits the migrating data to the server 3 in accordance with the data transmission request received from the server 3.

Thereby, when executing the export, it is possible to maintain superiority of the user terminal 4 by using the user terminal 4 as a processing system executing a command for the multifunction peripheral 2 of the migration source and the server 3 and to reduce a processing load of the user terminal 4 by exporting the migrating data with communication between the multifunction peripheral 2 of the migration source and the server 3.

Alternatively, in the information processing system 1 of the embodiment, when starting the export, the multifunction peripheral 2 of the migration source transmits the data identification information to the user terminal 4 by short range wireless communication and transmits the migration source information of the multifunction peripheral 2 of the migration source to the server 3. The server 3 transmits the data transmission request to the multifunction peripheral 2 of the migration source on the basis of the migration source information received from the multifunction peripheral 2 of the migration source. The multifunction peripheral 2 of the migration source transmits the migrating data to the server 3 in accordance with the data transmission request received from the server 3.

Thereby, when executing the export, by reducing a communication flow through the user terminal 4, it is possible to reduce a processing load of the user terminal 4 and to quickly export the migrating data.

Moreover, for example, in the information processing system 1 of the embodiment, when starting the import, the multifunction peripheral 2 of the migration destination receives the data identification information from the user terminal 4 by short range wireless communication and transmits the data identification information and the migration destination information of the multifunction peripheral 2 of the migration destination to the server 3. The server 3 transmits the migrating data to the multifunction peripheral 2 of the migration destination on the basis of the data identification information and the migration destination information received from the multifunction peripheral 2 of the migration destination.

Thereby, when executing the export, by reducing a communication flow through the user terminal 4, it is possible to reduce a processing load of the user terminal 4 and to quickly import the migrating data.

Alternatively, in the information processing system 1 of the embodiment, when starting the import, the multifunction peripheral 2 of the migration destination transmits the migration destination information of the multifunction peripheral 2 of the migration destination to the user terminal 4 by short range wireless communication. The user terminal 4 transmits the migration destination information received from the multifunction peripheral 2 of the migration destination and the data identification information received at the export to the server 3. The server 3 transmits the migrating data to the multifunction peripheral 2 of the migration destination on the basis of the data identification information and the migration destination information received from the user terminal 4.

Thereby, when executing the import, it is possible to maintain superiority of the user terminal 4 by using the user terminal 4 as a processing system executing a command for the multifunction peripheral 2 of the migration destination and the server 3 and to reduce a processing load of the user terminal 4 by importing the migrating data with communication between the multifunction peripheral 2 of the migration destination and the server 3.

Although the above-described embodiment was described about a case of applying the configuration of the present disclosure to the information processing system 1 including the multifunction peripherals 2, in a different embodiment, the configuration of the present disclosure may be applied to the other information processing system including the other image forming apparatus, such as a printer, a copying machine or a facsimile, or the other electronic device if short range wireless communication with the user terminal 4 can be achieved.

Incidentally, the description of the embodiment is one example of the information processing system according to the present disclosure, but the technical scope of the present disclosure is not limited to the embodiment.

The invention claimed is:
1. An information processing system comprising:
a first information processing apparatus of a data migration source;
a second information processing apparatus of a data migration destination;
a server capable of communicating with the first information processing apparatus and the second information processing apparatus via a predetermined network; and
a user terminal capable of communicating with the first information processing apparatus and the second information processing apparatus by short range wireless communication and capable of communicating with the server via the network;
wherein the first information processing apparatus starts export of predetermined migrating data including print settings, an address book and a system setting in accordance with short range wireless communication with the user terminal and transmits the migrating data, to which predetermined data identification information is added, to the server, the server receives the migrating data from the first information processing apparatus and stores the migrating data, the second information processing apparatus starts import of the migrating data in accordance with short range wireless communication with the user terminal, the server reads out the migrating data on the basis of the data identification information and transmits the migrating data to the second information processing apparatus, the second information processing apparatus receives the migrating data from the server and stores the migrating data.

2. The information processing system according to claim 1, wherein the first information processing apparatus transmits, when starting the export, migration source information of the first information processing apparatus and the data identification information to the user terminal by short range wireless communication, the user terminal transmits the migration source information received from the first information processing apparatus to the server, the server transmits data transmission request to the first information processing apparatus on the basis of the migration source information received from the user terminal, the first information processing apparatus transmits the migrating data to the server in accordance with the data transmission request received from the server.

3. The information processing system according to claim 1, wherein the first information processing apparatus transmits, when starting the export, the data identification information to the user terminal by short range wireless communication and transmits migration source information of the first information processing apparatus to the server, the server transmits data transmission request to the first information processing apparatus on the basis of the migration source information received from the first information processing apparatus, the first information processing apparatus transmits the migrating data to the server in accordance with the data transmission request received from the server.

4. The information processing system according to claim 1, wherein the second information processing apparatus receives, when starting the import, the data identification information from the user terminal by short range wireless communication and transmits the data identification information and migration destination information of the second information processing apparatus to the server, the server transmits the migrating data to the second information processing apparatus on the basis of the data identification information and the migration destination information received from the second information processing apparatus.

5. The information processing system according to claim 1, wherein the second information processing apparatus transmits, when starting the import, migration destination information of the second information processing apparatus to the user terminal by short range wireless communication, the user terminal transmits the migration destination information received from the second information processing apparatus and the data identification information received at the export to the server, the server transmits the migrating data to the second information processing apparatus on the basis of the data identification information and the migration destination information received from the user terminal.

6. The information processing system according to claim 1, wherein the data identification information is determined by containing information peculiar to the first information processing apparatus so as to avoid overlap with the other data identification information.

7. The information processing system according to claim 1, wherein the second information processing apparatus transmits an import completion notification to the user terminal when the import is completed.

8. The information processing system according to claim 1, wherein the server transmits an export completion notification to the user terminal when the export is completed.

9. The information processing system according to claim 1, wherein the first information processing apparatus and the second information processing apparatus are composed of respective image forming apparatus.

* * * * *